United States Patent [19]
Yada et al.

[11] Patent Number: 5,167,893
[45] Date of Patent: Dec. 1, 1992

[54] METHOD OF PRODUCING AUTOMOBILE WINDSHIELD MOLDING

[75] Inventors: Yukihiko Yada, Nagoya; Yoichi Hirai, Ohbu, both of Japan

[73] Assignee: Tokai Kogyo Kabushiki Kaisha, Ohbu, Japan

[21] Appl. No.: 756,273

[22] Filed: Sep. 6, 1991

[30] Foreign Application Priority Data

| Sep. 6, 1990 | [JP] | Japan | 2-236397 |
| Oct. 23, 1990 | [JP] | Japan | 2-283344 |
| Nov. 30, 1990 | [JP] | Japan | 2-340853 |

[51] Int. Cl.⁵ .............................. B29C 47/12
[52] U.S. Cl. ...................... 264/167; 264/177.16; 425/381; 425/465; 425/466
[58] Field of Search .......... 264/167, 177.1, 177.16, 264/177.17, 177.19, 177.20; 425/465, 466, 113, 381, 461, 467

[56] References Cited

U.S. PATENT DOCUMENTS

| 4,256,685 | 3/1981 | Vassar | 264/167 |
| 4,419,315 | 12/1983 | Kessler | 425/381 |
| 4,584,150 | 4/1986 | Ballocca | 264/167 |
| 4,765,936 | 8/1988 | Ballocca | 264/46.1 |
| 4,865,796 | 9/1989 | Tamura et al. | 264/149 |
| 5,061,335 | 10/1991 | Tamura et al. | 264/177.1 |

FOREIGN PATENT DOCUMENTS

| 59-70528 | 4/1984 | Japan | 425/381 |
| 1-204713 | 8/1989 | Japan | 264/177.16 |
| 2-34449 | 2/1990 | Japan | 425/461 |
| 2-34450 | 2/1990 | Japan | 425/461 |

*Primary Examiner*—Jeffery Thurlow
*Attorney, Agent, or Firm*—Oblon, Spivak, McClelland, Maier & Neustadt

[57] ABSTRACT

An automobile windshield molding is produced by a molding machine having dies. A method of producing the molding includes the step of extruding molding material through a hollow portion formed by the dies. The shape of the hollow portion is changed by moving the dies according to the cross-sectional shape of the molding, thereby widening part of the hollow portion of the dies to increase the thickness of the molding material. One of the dies is projected into the widened part of the hollow portion to form a water drain channel on a large thickness portion of the molding.

4 Claims, 14 Drawing Sheets

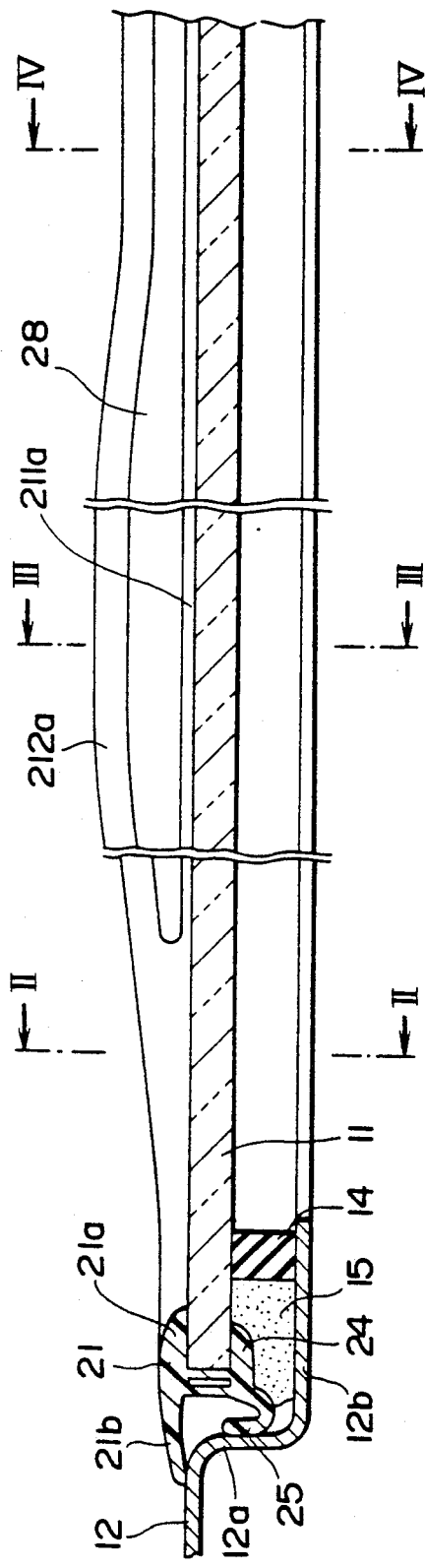
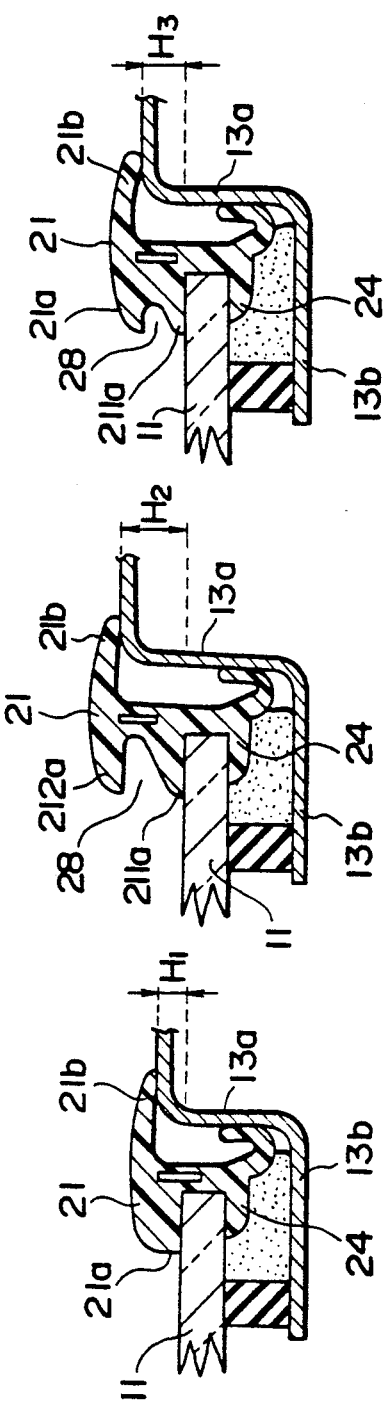

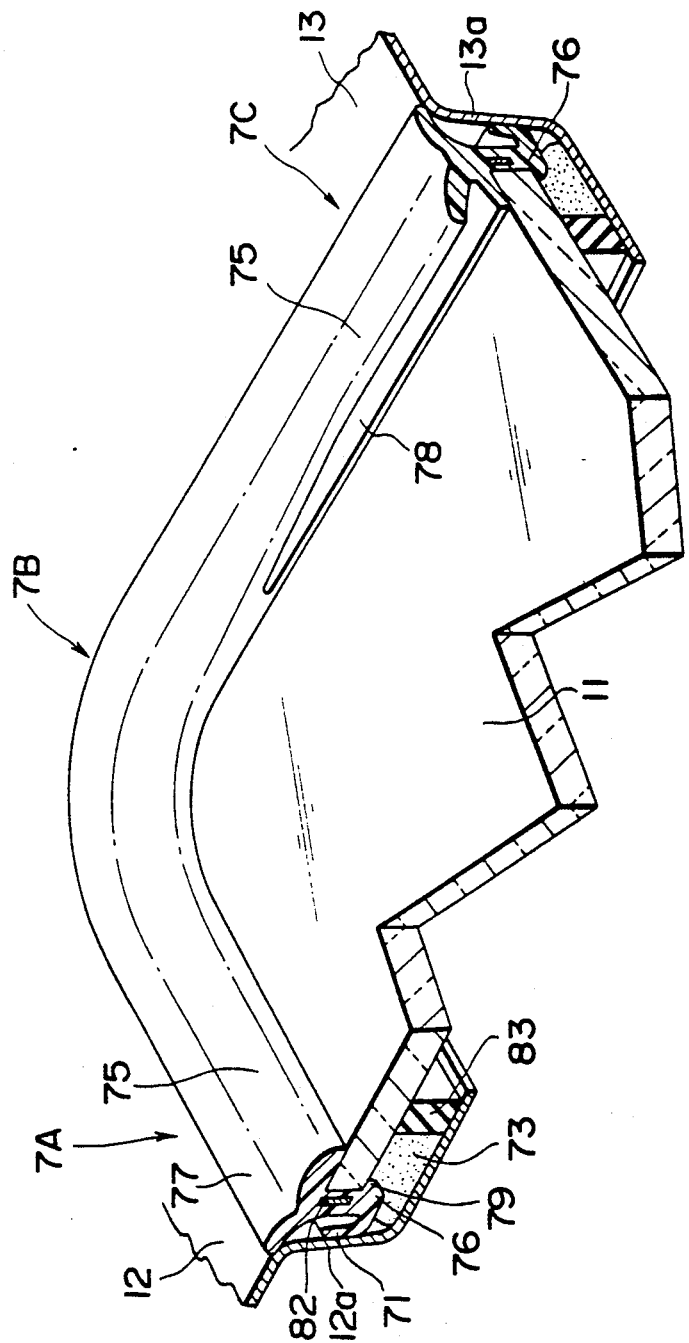

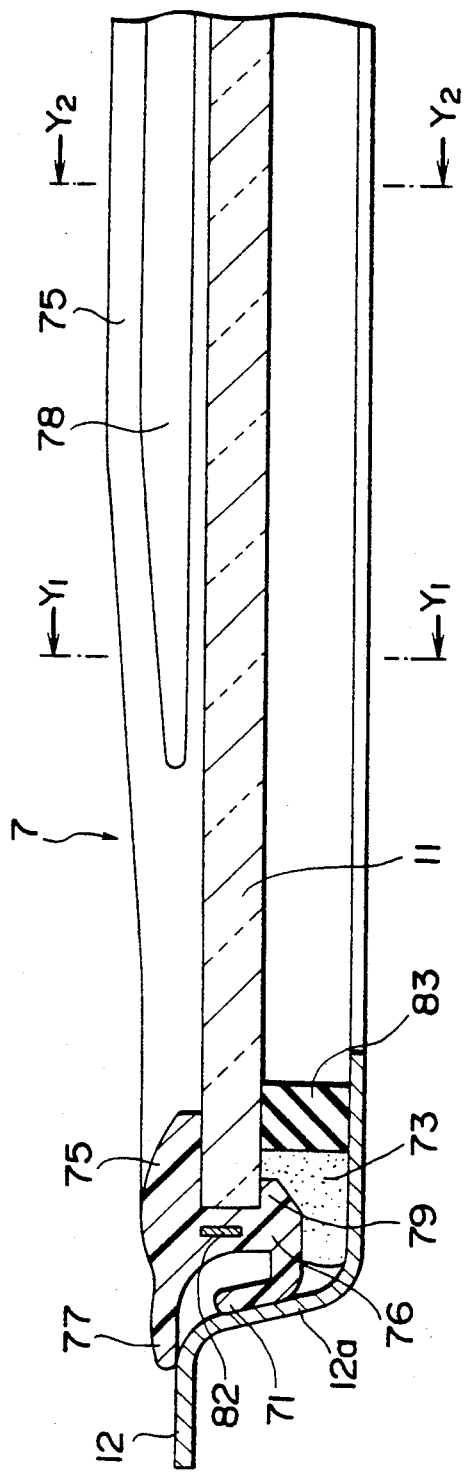
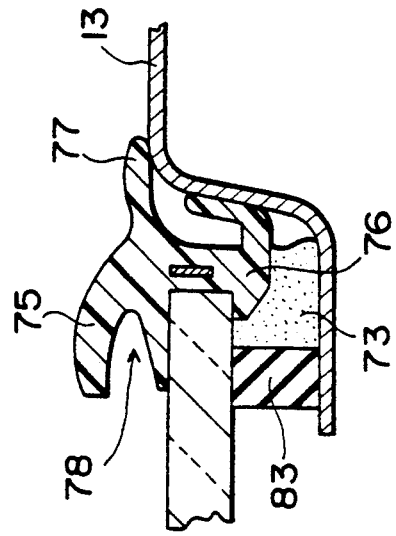
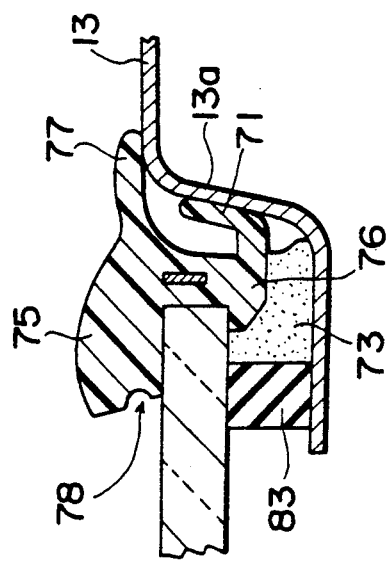

METHOD OF PRODUCING AUTOMOBILE WINDSHIELD MOLDING

BACKGROUND OF THE INVENTION

1. Field of the Invention

This invention relates to a method of producing an automobile windshield molding for a motor vehicle body to seal the space between a windshield and a periphery of a window opening of a vehicle body panel.

2. Description of the Related Art

An automobile windshield molding is usually attached around an edge of a windshield so as to seal the space between a windshield and a window opening of a vehicle body panel. The automobile windshield molding is directly attached to the vehicle body panel or is supported by a fastener fixedly mounted on the body panel.

Examples of such molding are exemplified in Japanese Patent Laid-Open Publication No. 244820/1989 and No. 269612/1989.

In the former, an extruded molding has two grooves on its side surfaces. One of the two grooves is removed at a portion associated with the upper part of the windshield. At corner portions, the molding is elastically reshaped so that the glass receiving groove on the upper part and that on the side part can be aligned. The other groove on the molding at each side panel part serves as a water drain channel.

Since the cross section of this molding is uniform, the molding cannot be applied to a vehicle body panel having a slanted portion for the windshield. In addition, the ends of the removed groove may be exposed at the corner portions.

To overcome the above inconveniences, Japanese Patent Laid-Open Publication No. 269612/1989 was proposed, in which a long extruded molding is of a simple shape and has a connecting portion. The connecting portion is cut at the upper and side molding parts so that the connecting portion extends to different heights at these molding parts. A glass receiving groove is formed when cutting the connecting portion. Then the molding is elastically reshaped so that the glass receiving groove at the upper molding part and that at the side molding part can be aligned. At the side molding part, the connecting portion serves as a wall, outside of which a water drain channel is formed.

In the second case, there are some inconveniences. For example, a part of the molding should extend over the glass surface to a certain amount when considering variations in manufacturing precision or assembling work. In such a case, the more the molding extends over the glass surface, the less the sectional area of the water drain channel.

SUMMARY OF THE INVENTION

It is therefore an object of this invention to provide an automobile windshield molding, in which a water drain channel is formed along the vehicle body side panel so as to serve as a dam.

According to this invention, the following method is provided to produce a strip of an automobile windshield molding for sealing the space between a windshield and a periphery of a window opening of a vehicle body panel by using a molding machine including dies: extruding molding material through a hollow portion formed by the dies to form a pair of side molding parts, a pair of corner molding parts and an upper molding part in succession; changing the shape of the hollow portion by moving dies according to the cross-sectional shape of side, corner and upper molding parts to be made; widening part of the hollow portion of the dies to increase thickness of the molding material at a portion corresponding to the cross-sectional shape of a side molding part; and projecting one of dies into the widened part of the hollow portion of the dies at a predetermined timing to form a water drain channel on the large thickness portion of the side molding part.

BRIEF DESCRIPTION OF THE DRAWINGS

FIG. 3 is a cross sectional view taken along the line I—I of FIG. 1;

FIG. 4 is a cross sectional view taken along the line II—II of FIG. 3;

FIG. 5 is a cross sectional view taken along the line III—III of FIG. 3;

FIG. 6 is a cross sectional view taken along the line IV—IV of FIG. 3;

FIG. 16 is a cross sectional view of a corner portion of a windshield molding according to a fourth embodiment;

FIG. 17 is a cross sectional view taken along line X—X of FIG. 16;

FIG. 18 is a cross sectional view taken along line $Y_1$—$Y_1$ of FIG. 17;

FIG. 19 is a cross sectional view taken along line $Y_2$—$Y_2$ of FIG. 17;

DETAILED DESCRIPTION

FIG. 1 to 6 show an automobile windshield molding, which is produced by a method according to one embodiment of the invention.

Figure 1:
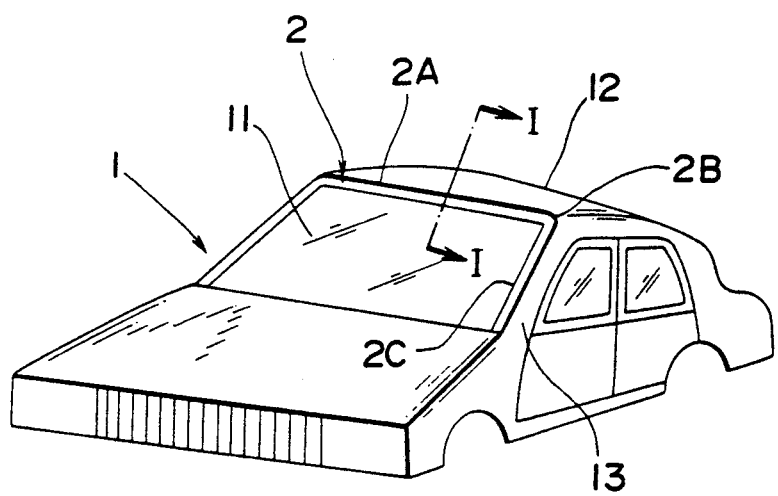
FIG. 1 is a front perspective view of a vehicle body having a windshield molding.

As shown in FIG. 1, a molding 2 is installed so as to seal the space between a windshield and a periphery of a window opening of a vehicle body panel.

The molding 2 is a long strip in the shape of T, and an upper molding part 2A to be mounted between the upper edge of the windshield and the roof panel 12, side molding parts 2C between side edges of the windshield 11 and pillar panels 13 of the vehicle body, and corner molding parts 2B for connecting the upper and side molding parts 2A and 2B. All of these molding parts 2A to 2C are extruded as one unit.

Each of the side, corner and upper molding parts 2A to 2C comprises an exterior wing 21 adapted to cover a space, on the exterior side of the vehicle, between the window-opening periphery of the vehicle body panel and each of side, corner and upper edges of the windshield. The exterior wing 21 includes an inward wing portion 21a for covering the peripheral edge of the windshield, an outward wing portion 21b for covering the periphery of the vehicle body panel, and a connecting portion 22 extending from an interior side of the exterior wing 21.

The outward wing portion 21b has a uniform thickness in its lengthwise direction. On the contrary, the inward wing portion 21a is uniformly thick on the upper molding part 2A, but is thickened gradually from the corner molding part 2B to the side molding part 2C. Specifically, the inward wing portion 21a is thickest at the central portion of the side molding part 2C. Then the inward wing portion 21a is made gradually thin toward the end of the side molding part 2C.

The connecting portion 22 divides the interior side of the exterior wing into inward and outward surfaces. There is a varying difference in height between the inward and outward surfaces. The connecting portion 22 is short on the upper molding part 2A (shown in FIG. 3), and gradually becomes longer on the side molding parts 2C (shown in FIGS. 4 to 6), because the distance between the surface of the windshield 11 and the surface of the front pillars 13 is increased compared with the distance between the surface of the windshield 11 and the surface of the roof panel. Specifically, the connecting portion 22 is made gradually longer from the corner molding part 2B toward the central portion of the side molding part 2C, and is again made a little shorter at the end of the side molding part 2C.

Figure 2:
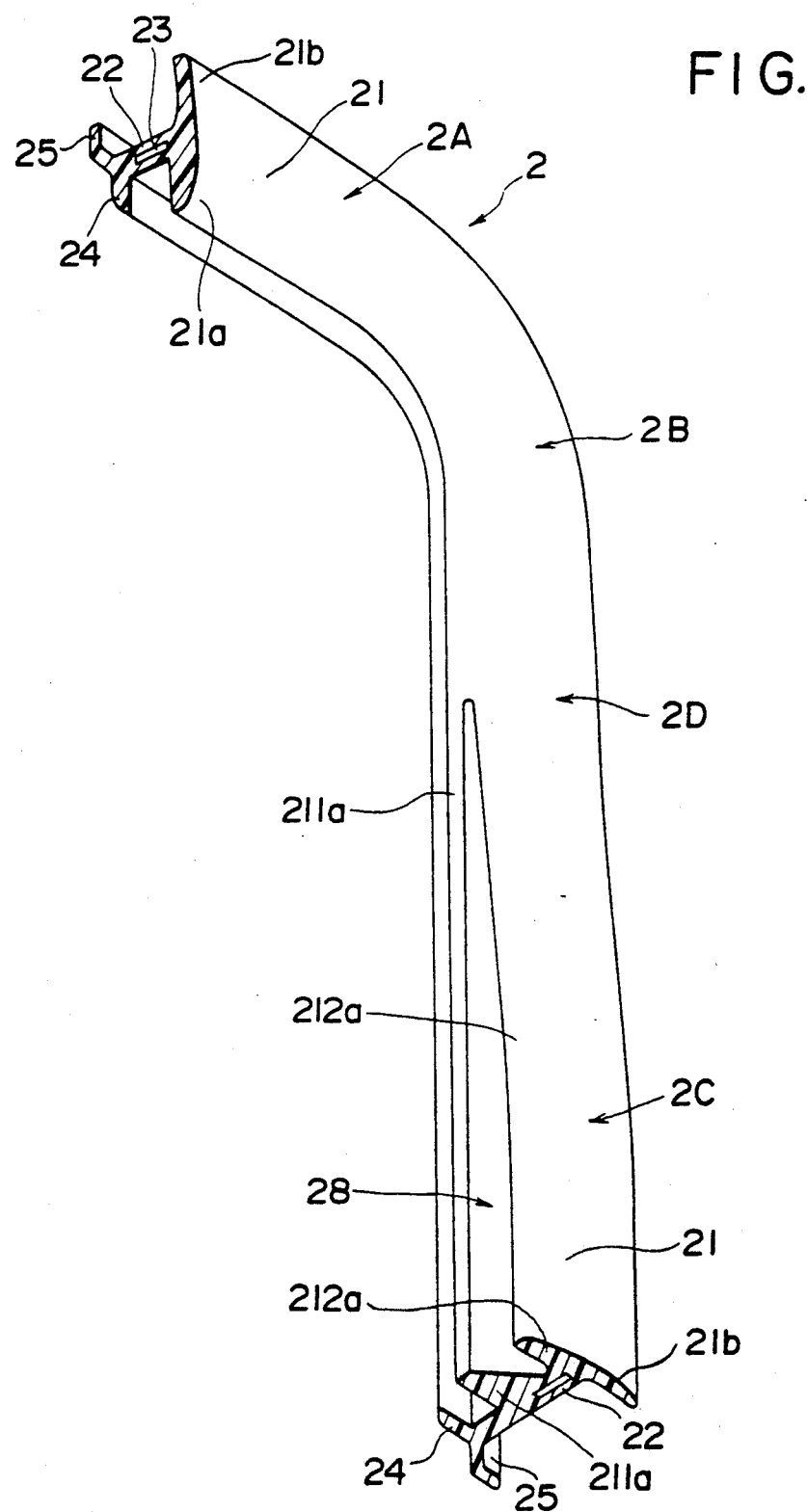
FIG. 2 is a perspective view of a windshield molding according a first embodiment of the invention.

The connecting portion 22 has a foot 24 extending inwardly along the end thereof as shown in FIG. 2. The foot 24 serves to assist in supporting the windshield 11. The connecting portion 22 also has a flexible lip 25 extends outwardly along the end thereof.

A thin metallic foil 23 serving as a core metal is embedded lengthwise in the connecting portion 22 near the junction with the exterior wing 21.

A water drain channel each 28 is defined on an inner wall of the large-thickness part of the inward wing portion 21a of each side molding part 2B. The water drain channel 28 has a triangular cross section and is gradually deepened as the inward wing portion 21a becomes thick. An upper wall 212a and a lower wall 211a of the water drain channel 28 are made equally thick by adjusting the depth of the water drain channel 28. The drain channel 28 is located on the inward wing portion 21a between the end 2D of the corner molding part 2B and the end of the side molding part 2C.

The upper surface of the foot 24 and the interior side of the inward wing portion 21a are aligned in height with each other throughout all of the molding parts. In other words, the distance between the foot 24 and the inward wing portion 21a is equal to the thickness of the windshield 11.

The molding 2 will be attached to the windshield 11 and the vehicle body as described below.

FIGS. 3 to 6 show the manner in which the molding 2 is attached between the corner and the side edges of the windshield 11.

A window opening of the roof panel 12 has a slanted wall 12a and a flange 13b for receiving the windshield 11. The front pillar 13 also has a slanted wall 13a and the flange 13b for receiving the windshield 11. The slanted wall 13a has a height increased gradually from the corner to the side of the vehicle body panel compared with the slanted wall 12a.

Firstly, the molding 2 is attached around the peripheral edge of the windshield 11. Between the upper and corner parts, the edge of the windshield 11 is sandwiched between the foot 24 and the interior side of the inward wing portion 21a. Each of the side edges of the windshield 11 is sandwiched between the foot 24 and the interior side of the wall 211a.

A dam rubber 14 in strip shape is applied around the edges of the flanges 12b and 13b. An adhesive 15 is applied to the outer edge of the dam rubber 14. Then the windshield 11 having the molding 2 mounted therearound is placed on the dam rubber 14. The windshield 11 is then pressed toward the vehicle body, so that the outward wing portion 21b of the molding 2 overlies the body panels 12, 13. Therefore, the foot 24 of the molding 2 is fastened by the adhesive 15, and the flexible lip 25 of the molding 2 is flexibly contacted to the slanted walls 12a, 13b, thereby fastening the windshield 11 to the body panel.

The difference of the height between the outer surface of the body panel and the windshield 11 is equal to the difference of height between the slanted walls 12a and 13a as shown in FIGS. 3 to 6. As shown in FIG. 3, the upper edge of the windshield 11 is nearly flush with the surface of the roof panel 12. The height difference $H_1$ is small between the windshield 11 and the corner part of the front pillar 13 (shown in FIG. 4), while the difference $H_2$ is large at the side edges of the windshield 11 (shown in FIG. 5). The difference $H_3$ between the end of the side molding part and the front pillar 13 is larger than $H_1$ but smaller than $H_2$ (shown in FIG. 6).

It is understood that the thickness of the inward wing portion 21a of the molding 2 is changed according to the varying difference of the height between the windshield 11 and the body panel.

The edge of the outward wing portion 21b of the molding 2 is in close contact with the roof panel 12 between the upper and corner parts of the windshield 11. From the upper to corner molding parts, the inward wing portion 21a slightly extends toward the outer surface of the windshield 11, i.e. as shown in FIG. 4, the inward wing portion 21a is slightly thickened at the corner molding parts compared with the upper molding part. Therefore water is guided on the surface of the windshield along the wall of the inward wing portion 21a.

Since the inward wing portion 21a is slightly thickened at the corner molding parts, the exterior wing 21 is free from wrinkles even if it is bent along the corner portions.

FIG. 5 is a cross sectional view of the molding taken along line III—III of FIG. 3. As shown in FIG. 5, the water drain channel 28 is deepest and widest at the central portion of the side molding part 2C. The edge of the windshield 11 is sandwiched between the foot 24 and the interior side of the wall 211a of the inward wing portion 21a. The outward wing portion 21b is in close contact with the outer surface of the front pillar 13. On the side central portion of the windshield 11, water is guided downwardly along the drain channel 28 which has a largest opening.

FIG. 6 is a cross sectional view of the molding taken along line IV—IV of FIG. 3. The difference of the height between the body panel and the windshield is smaller than that at the side central portion. The drain channel 28 is lessened in its depth and width at the end portion compared with that at the side central portion. The outward wing portion 21b is contact with the outer surface of the front pillar 13 so that the windshield 11 is sandwiched between the foot 24 and the interior side of the lower wall 211a of the inward wing portion 21a. At the end portion of the molding 2, water is guided downwardly on the windshield along the water drain channel 28. Since the thicknesses of the upper wall 212a and the lower wall 211a are uniform on the side molding part 2C, it will be not unnatural even when the size of the water drain channel 28 changes.

Figure 7:
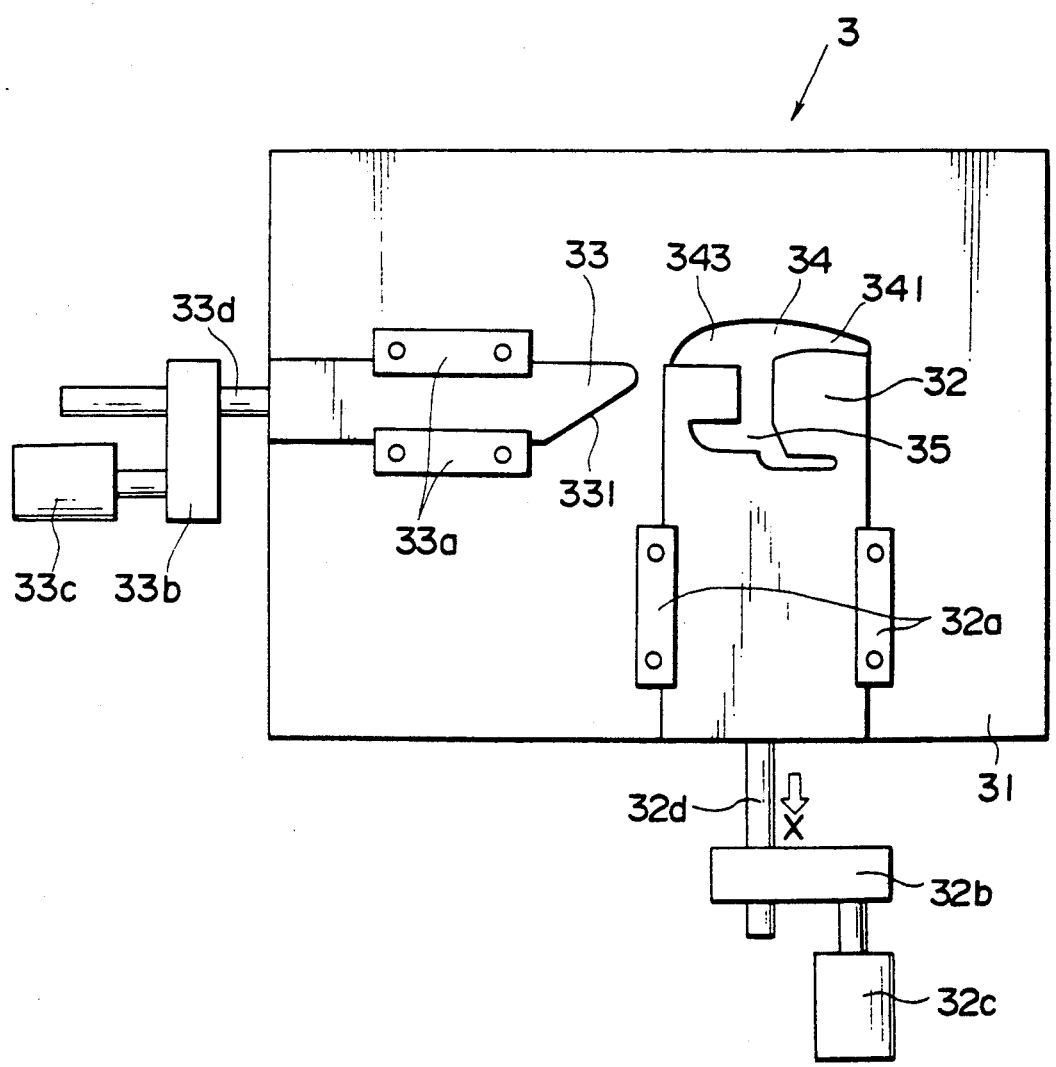
FIG. 7 is a front elevational view of a molding machine.
Figure 8:
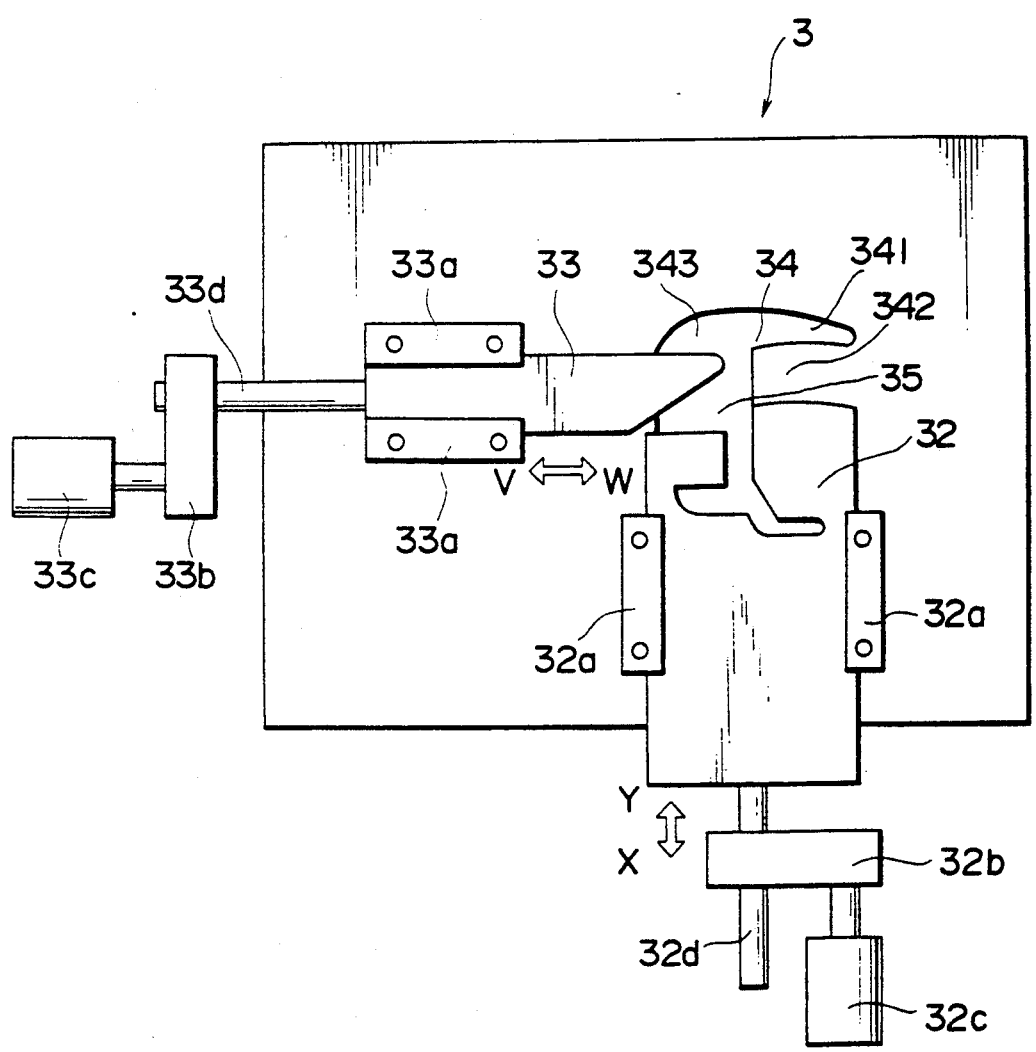
FIG. 8 shows the manner in which the molding machine operates.

A molding device for producing the molding 2 will be described with reference to FIGS. 7 and 8.

A molding device 3 comprises three dies having openings through which the plastic material is extruded. These dies are first, second and third dies 31, 32, 33 positioned in parallel to the direction for extruding the plastic material, i.e. in the direction perpendicular to the plane of FIG. 7 and 8.

The first die 31 is stationary, having an opening 34 shaped according to the cross sectional shape of the molding 2. Specifically, the upper portion of the opening 34 corresponds to the cross-sectional shape of the exterior wing 21, and the lower portion of the opening 34 substantially corresponds to the cross-sectional shape of the connecting portion 22, foot 24 and elastic lip 25.

The opening 34 has portions 341 and 343 corresponding to the shape of the upper side of the exterior wing 21 of the molding 2. The lower edge of the portion 341 together with the shield 342 corresponds to the shape of the lower part of the outward wing portion 21b. The lower section of the portion 343 substantially corresponds to the cross-sectional shape of the inward wing portion 21a.

The second and third dies 32, 33 are rectangular plates, which are respectively supported by a pair of guides 32a and a pair of guides 33a to be movable in parallel to the front side of the first die 31.

The second die 32 has an opening 35 which corresponds to the cross-sectional shape of the connecting portion 22, foot 24 and the flexible lip 25. The second die 32 is placed on the first die 31 so that the openings 34, 35 of the first and second dies 31, 33 are in the shape of the molding 2. The second die 32 has at its lower portion an operation lever 32d, which is connected to a motor 32c via a converter 32b for converting rotary motion of the motor 32c into rectilinear motion. When driven by the motor 32c, the second die 32 reciprocates between the positions for forming the upper and lower molding portions shown in FIGS. 7 and 8, respectively.

The third die 33 is a thin rectangular plate having a tip 331 pointed with an acute angle, reciprocating in the direction perpendicular to the second die 32. The third die 33 is connected to a motor 33c via an operation lever 33d and a converter 33b for converting the rotary motion to the rectilinear motion. The third die 33 is guided into and out of the opening 34 of the first die 31 so that the pointed tip 331 forms the water drain channel 28 on the inward wing portion 21a of the molding 2.

In operation, the molding machine 3 produces the molding 2 as described hereinafter.

The molding 2 comprises a side molding part 2C, a corner molding part 2B, upper molding part 2A, a corner molding part 2B and a side molding part 2C formed in the named order in succession.

Each of the side molding 2C and corner molding 2B will be described referring to FIG. 8.

Firstly, the second die 32 is placed on the first die 31 so that the openings 34 and 35 of the first and second dies are in the cross sectional shape of the side molding part 2C. The plastic material is extruded through the openings 34 and 35 together with a metallic foil strip 23 inserted in the upper central portion of the opening 35. In this case, the second die 32 is somewhat raised in the direction shown by an arrow Y, and the third die 33 is somewhat retracted in the direction shown by an arrow V.

The plastic material is extruded to a predetermined extent under this condition. Then the second die 32 is lowered in the direction X. The portion 343 of the opening 34 of the first die 31 is gradually widened to increase the thickness of the interior wing portion 21a. The other portions of the side molding part 2C are being shaped without any change.

The third die 33 is advanced in the direction W as the inward wing portion 21a is being thickened. Thus the third die 33 forms a water drain channel 28 on the thickened part of the inward wing portion 21b. Since the third die 33 is moved in synchronization with the moving speed of the second die 32, the depth and the width of the opening of the drain channel 28 are increased but the thicknesses of the upper wall 212a and the lower wall 211a remain the same in the extruded molding. Under the condition shown in FIG. 8, the inward wing portion 21a is the thickest, and the opening of the water drain channel 28 is the widest and deepest. Thereafter, the plastic material is extruded to a predetermined length.

When the side molding part 2C is extruded to the predetermined length and a corner molding part 2B is to be formed, the second die 32 is raised again in the direction Y and the third die 33 is retracted to the direction V. Then, the portion 343 of the opening 34 of the first die 31 is reduced in size, thereby thinning a large thickened portion of the inward wing portion 21a and the water drain channel 28. The other portions of the side molding part remain unchanged.

When the third die 33 is retracted completely from the portion 343 of the opening 34, the second die 32 is moved in the direction Y until the top of the second die 32 is flush with the edge of the shield 342 of the first die 31. Under this condition, the molding extruded from the openings 34 and 35 is shaped so that the inward wing portion 21a is thinned gradually and the water drain channel 28 disappears, serving as the corner molding part 2C.

The top of the shield 342 of the first die 31 and the edge of the opening 341 of the second die 32 are flush with each other, i.e. the shape of the openings 34 and 35 matched together corresponds to the cross sectional shape of the upper molding part 2A. Under this condition, the motors are stopped, and the plastic material is extruded through the openings 34 and 35 for a predetermined period of time to produce the upper molding part 2A.

When the upper molding part 2A becomes long as predetermined, the motor 32c is driven again to produce the corner molding part 2C. Thus the molding 2 is produced in the shape of a strip.

Another windshield molding which is produced by a method according a second embodiment will be described referring to FIGS. 9 to 12.

Figure 9:
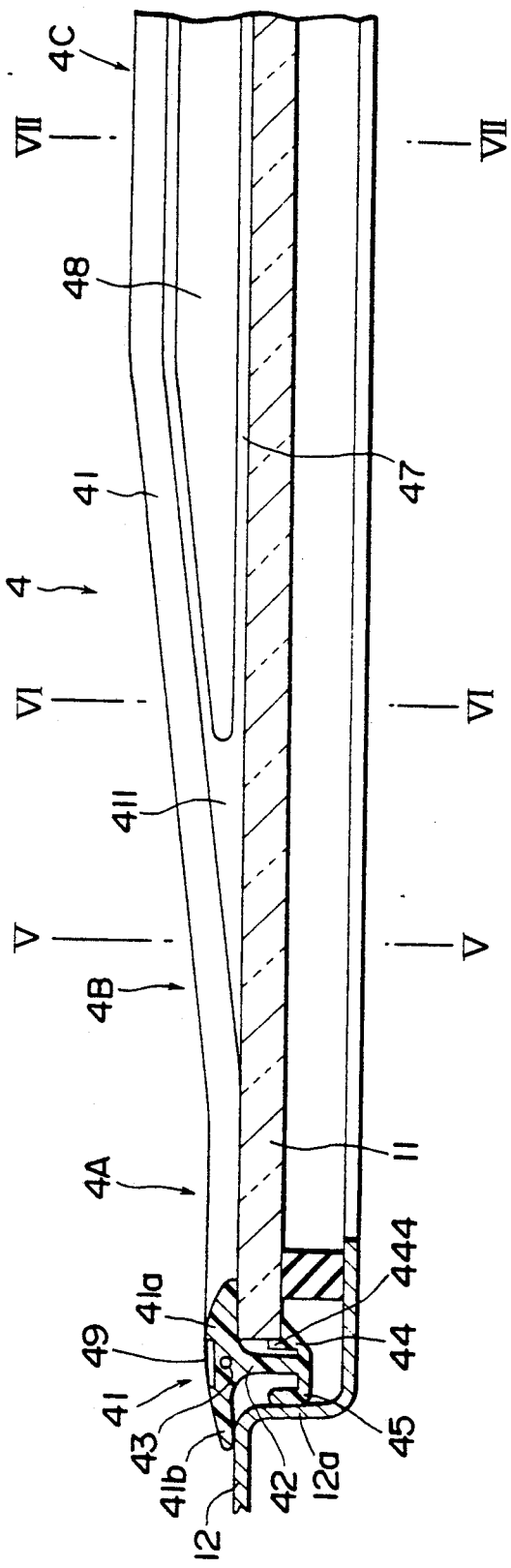
FIG. 9 is a perspective view of a molding according to a second embodiment of the invention.

FIG. 9 is a cross sectional view showing a windshield molding 4 attached in the space between the vehicle body penal and the windshield, taken along line I—I of FIG. 1. The same reference numerals as those in the first embodiment will be assigned to the portions and units which are identical to those in the first embodiment, and the description on them will be omitted.

The molding 4 comprises a pair of extruded side molding parts 4C, a pair of extruded corner molding parts 4B, and an extruded upper molding part 4A integral and extending between the side and corner molding parts.

Each of the molding parts 4A, 4B and 4C includes an exterior wing 41 and a connecting portion 42.

The exterior wing 41 has an inward wing portion 41a and an outward wing portion 41b.

The connecting portion 42 has a foot 44 extending inwardly along the lower end thereof. The foot 44 has a dent 444 at its end. A flexible lip 45 extends outwardly along the lower end of the connecting portion 42. A wire 43 serving as a core material is embedded along the joint between the connecting portion 42 and the exterior wing 41 of the molding 4.

A metallic decorative film 49 is embedded along the central portion of the exterior wing 41 of the molding 4, i.e. along the border between the inward wing portion 41a and the outward wing portion 41b. throughout the molding 4.

The thickness of the inward wing portion 41a of the molding 4 is changed according to the varying difference of height between the body panels 12, 13 and the windshield. The depth and width of a water drain channel 48 are varied with the thickness of the inward wing portion 41a. In addition, an upper wall 412a and side molding part 4C, respectively.

The windshield 11 will be installed on the vehicle body by using the molding 4 as described below.

Figure 10:
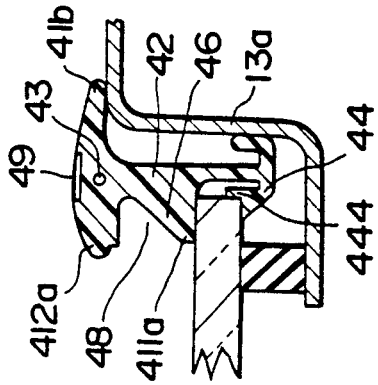
FIG. 10 is a cross sectional view taken along the line V—V of FIG. 9.

FIG. 10 is a cross sectional view of the molding 4 taken along line V—V of FIG. 9. At the upper and corner molding parts, the interior edge of the wind shield 11 is supported on the dent 444 of the foot 44. The inward wing portion 41a covers the exterior edge of the windshield 11 41a. The outward wing portion 41b is in close contact with and covers the corner part of the front pillar 13. The flexible lip 45 is contacted to a slanted wall 13a of the front pillar 13.

The water on the windshield 11 is guided along the thickened wall 411 of the inward wing portion 41a.

Figure 11:
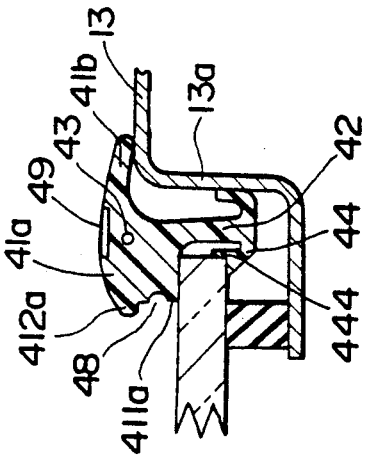
FIG. 11 is a cross sectional view taken along line VI—VI of FIG. 9.

FIG. 11 is a cross sectional view taken along line VI—VI of FIG. 9. At the end of the corner molding part, a water drain channel 48 is narrower and shallower than that at the central portion of the side molding part 4C. At the end of the corner portion, water is guided in the drain channel 48 along the lower wall 411a.

Figure 12:
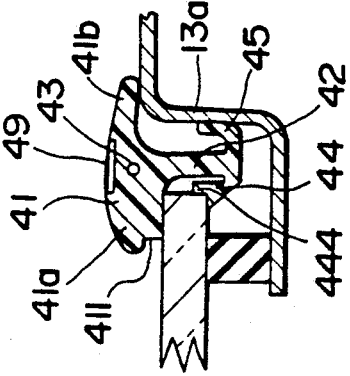
FIG. 12 is a cross sectional view taken along line VII—VII of FIG. 9.

FIG. 12 is a cross sectional view, taken along line VII—VII of FIG. 9, at the central portion of the side molding part 4C. At the central portion of the side molding part 4C, the drain channel 48 is widened and deepened on the lower wall 411a. The water is guided through the enlarged drain channel 48.

Figure 13:
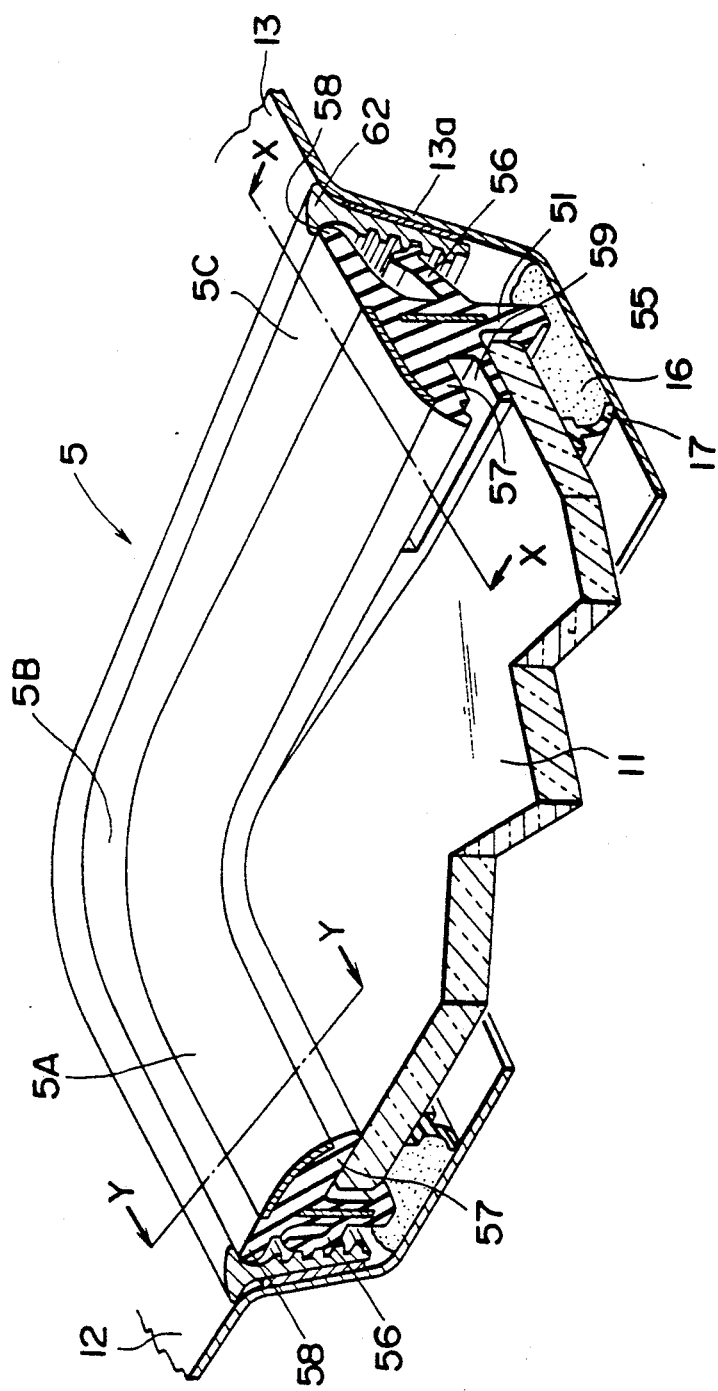
FIG. 13 is a partial cross sectional view of a corner portion of a windshield molding according to a third embodiment of the invention.

FIG. 13 shows a third example of a windshield molding produced by a method according a further embodiment of the invention. As shown in FIG. 13, a molding 5 comprises a pair of extruded side molding parts 5C, a pair of extruded corner molding parts 5B, and an extruded upper molding part 5A integral with and extending between the side and corner molding parts.

Each of the molding parts 5A, 5B and 5C includes an exterior wing 52 and a connecting portion 51. The exterior wing 52 has an inward wing portion 57 and an outward wing portion 58. The thickness Ta of the inward wing portion 57 (shown in FIG. 14) and the thickness Tb of the inward wing portion 55 (shown in FIG. 15) vary with the difference of height of the windshield 11 and the body panels 12, 13. The connecting portion 51 of the molding parts 5A, 5B and 5C is inserted into the space between the windshield 11 and the body panels 12 and 13 so as to cover the space decoratively.

Figure 14:
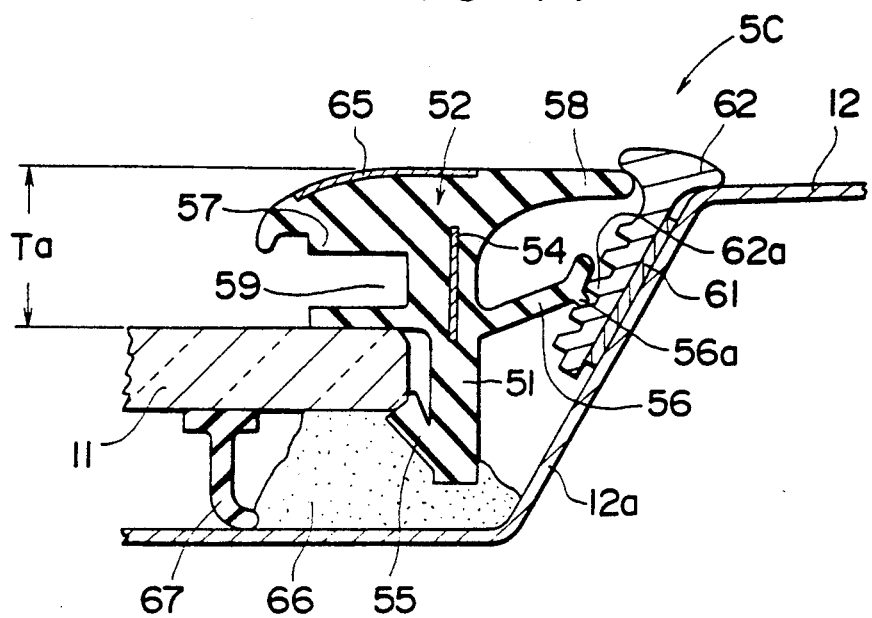
FIG. 14 is an enlarged cross sectional view taken along line X—X of FIG. 13.

As shown in FIGS. 13 and 14, the connecting portion 51 of the side molding part 5C includes a lip 55 extending inwardly along the lower end thereof, and a panel lip 56 extending outwardly along the central portion thereof.

A water drain channel 59 having a rectangular cross section is formed on the interior side of the inward wing portion 57 of the molding 5. The side molding part 5C is attached to the side edge of the windshield 11 by means of the interior side of the exterior wing 52 and the lip 55. A fastener 62 is stuck to the slanted walls 12a, 13a of the body panels 12, 13 with a double adhesive tape 61. A projection 56a of the panel lip 56 engages with a projection of the fastener 62, so that the outward wing portion 58 engages with the body panel flexibly.

Figure 15:
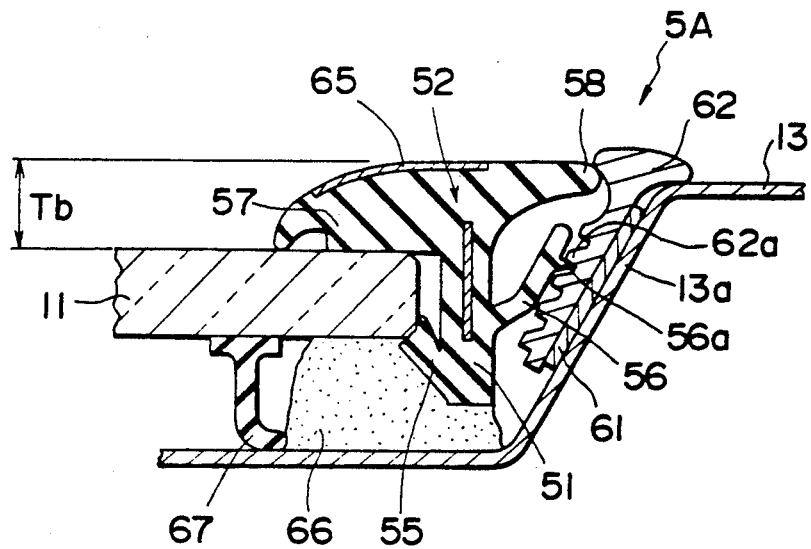
FIG. 15 is an enlarged cross sectional view taken along line Y—Y of FIG. 13.

As shown in FIGS. 13 and 15, the thickness Tb of the inward wing portion 57 is small at the upper molding part 5A compared with that at the side molding part 5C. The structure of the upper molding part 5A is substantially the same as that of the side molding 5C except for the inward wing portion 57, which does not have any large-thickness part.

As shown in FIG. 13, thickness and width of the inward wing portion 57 are gradually increased from the corner molding part 5B toward the side molding part 5C. The drain channel 59 formed on the large-thickness part of the inward wing portion 57 gradually becomes shallower from the side molding part 5C toward the corner molding part 5B and disappears finally.

The molding 5 is first attached around the edge of the windshield 11, and is then mounted in the window opening of the vehicle body. Otherwise, the windshield 11 is attached in the window opening beforehand, and then the molding 5 is inserted in the space between the windshield 11 and the body panels 12, 13 with the connecting portion 51 sandwiched in the space.

The molding 5 includes a reinforcing core material 54 embedded therein, and a decorative tape stuck on the inward wing portion 57. In FIGS. 13 to 15, reference numeral 66 stands for a sealant for fastening the windshield 11 and the molding 5 to the vehicle body panels 12, 13, and 67 represents a dam rubber for preventing flow of the sealant 66.

The water pushed by a non-illustrated wiper toward the opposite sides of the windshield is guided along the drain channel 59 formed on the large-thickness portion of the inward wing portion 57. Therefore the water is prevented from dispersing onto the side windows of the vehicle, thereby keeping a good field of view from the driver's position.

FIG. 16 is a partial cross sectional view showing a corner molding part 7B of a molding 7. The molding 7 comprises a pair of extruded side molding parts 7C, a pair of extruded corner molding parts 7B, and an extruded upper molding part 7A integral and extending between the side and corner molding parts. Each of the side, corner and upper molding parts includes an exterior wing and a connecting portion 76.

Figure 20:
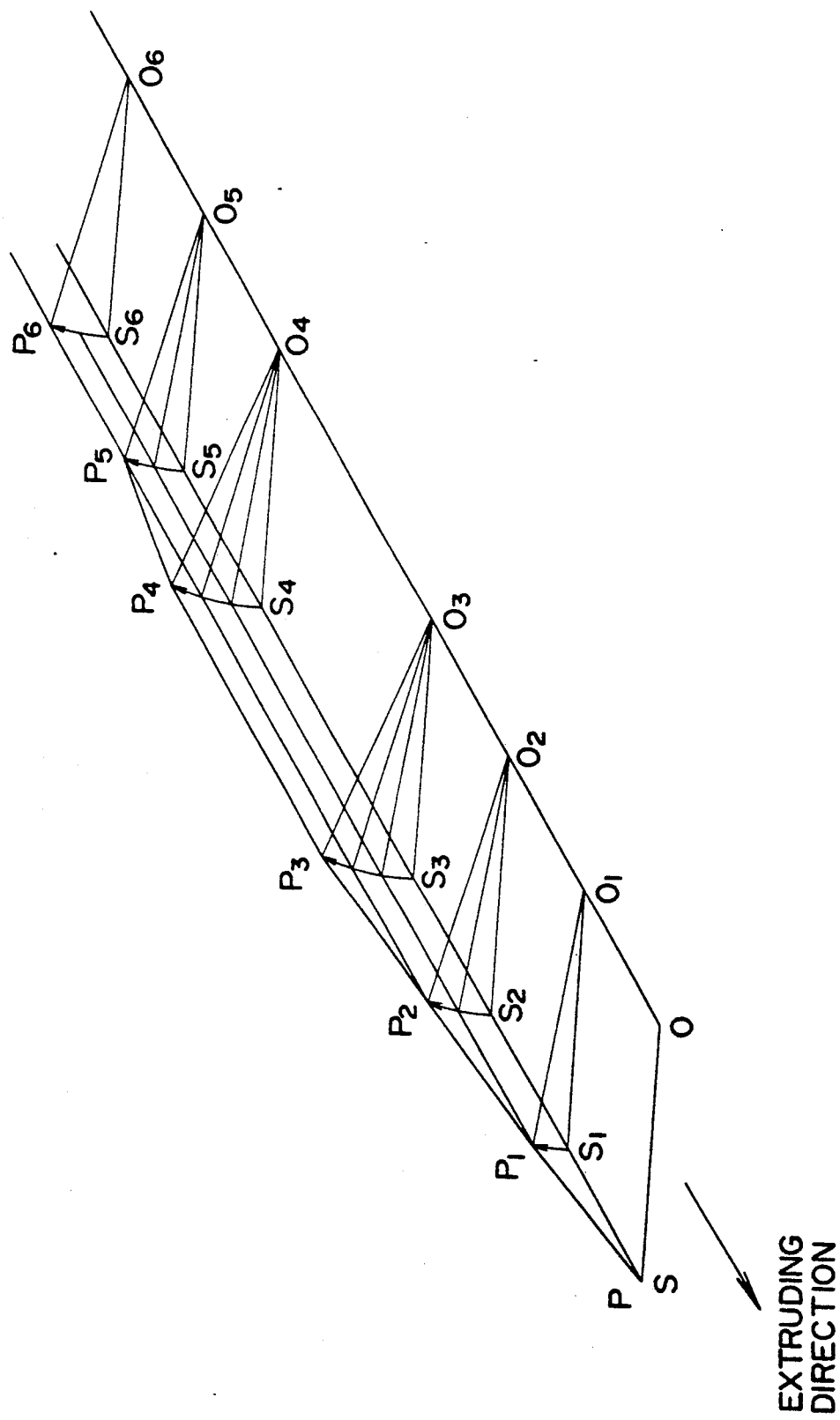
FIG. 20 is a schematic perspective view showing the surface of a side molding.

The exterior wing has an outward wing portion 75 for covering the periphery of the vehicle body panel, and an inward wing portion 77 for covering the edge of the windshield. The outward wing portion 77 and the inward wing portion 75 are equally thick at the upper molding part 7A. However the inward wing portion 75 changes its shape gradually. Specifically, the inward wing portion 75 bulges to extend exteriorly at each of side molding parts 7C. As shown in FIG. 20, the inward wing portion 75 bulges exteriorly as if it rotates at a radius OP. The edge of the inward wing portion 75 is contoured as shown by P, $P_1$, $P_2$, $P_3$, $P_4$ in FIG. 20.

A water drain channel 78 is formed on the large-thickness portion of the inward wind portion 75 at the side molding part 7C.

The shape of the connecting portion 76 is substantially the same at the molding parts 7A, 7C. The connecting portion 76 has a lip 79 extending inwardly along the lower end thereof, and a panel lip 71 extending outwardly along the lower end thereof.

When the molding 7 is inserted into the space between the window opening and the windshield 11, the windshield 11 is sandwiched by the interior side of the exterior wing and the lip 79 of the connecting portion 76, so that the windshield 11 is mounted to the vehicle body via the molding 7. Under this condition, the panel lip 71 is flexibly contacted to the slanted portions 12a, 13a of the roof panel 12 and the pillar panel 13, and the outward wing portion 77 is flexibly contacted to the roof panel 12 and the pillar panel 13.

In FIG. 16 to FIG. 19, reference numeral 82 stands for a reinforcement core material embedded in the connecting portion 76, and 83 represents a dam rubber for preventing flow of the sealant 73.

Figure 21:
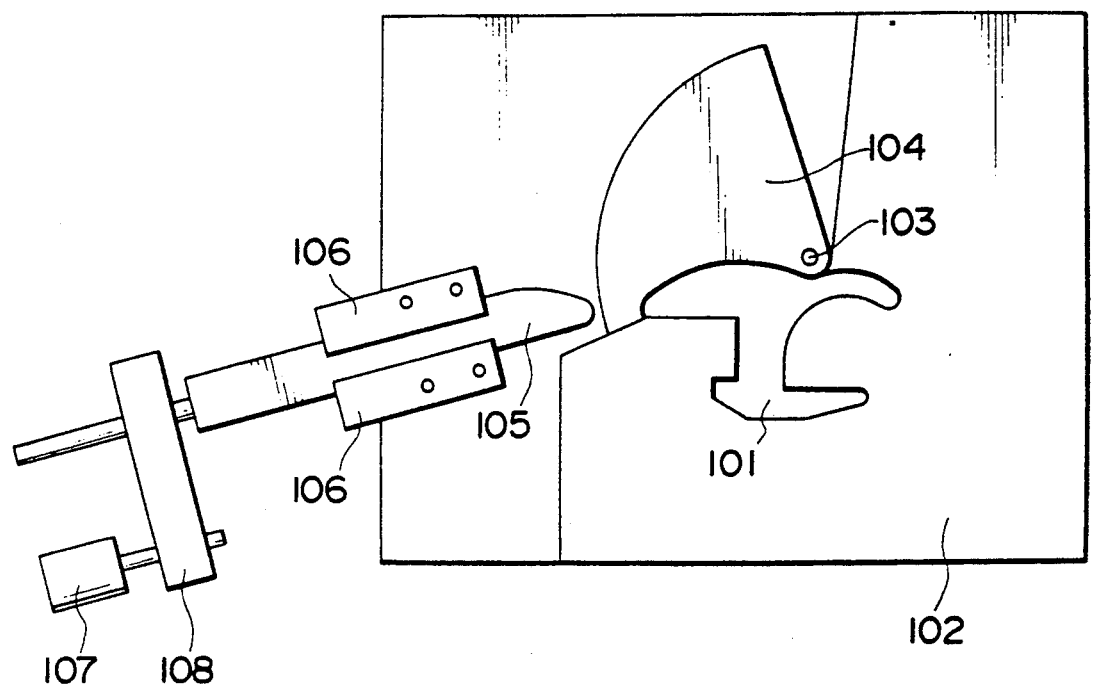
FIG. 21 to FIG. 23 are front elevational views showing the manner in which the molding machine operates successively.

A molding device for producing the molding 7 will be described with reference to FIG. 21 to FIG. 23.

The molding device comprises first to third dies 102, 104, 105 which are positioned in parallel to the direction (perpendicular to the plane of FIG. 21) in which the molding 7 is extruded, forming an opening through which plastic material is to be extruded. The first die 102 is stationary, having an opening 101 which is shaped according to the cross-sectional shape of the molding 7. As shown in FIG. 23, a left upper portion of the opening 101 corresponds to the cross-sectional shape of the inward wing portion 75 prior to formation of a water drain channel 78.

The second and third dies 104, 105 are made of plate members, and are supported to be movable on the front surface of the first die 102. The second die 104 is in the shape of sector, being positioned over the opening 101 for forming the inward wing portion 75, and being rotatable centrally of the fulcrum 103. The fulcrum 103 is located at a position corresponding to the boundary between the inward and outward wing portions 75, 77 of the molding 7. The second die 104 is operated to change the shape of the opening 101 according to the area of the inward wing portion 75.

The third die 105 is guided by a pair of guides 106 to be rectilinearly movable. The third die 105 is connected to a motor 107 via an operating lever and a converter 108. The rotary motion of the motor 107 is converted into the rectilinear motion by the converter 108. Therefore the third die 105 moves rectilinearly, advancing and retracting into and from the opening 101 at portions for forming the upper, corner and side molding parts.

The third die 105 has a triangularly pointed tip to form a water drain channel 78 on the inward wing portion. The third die 105 is movable into and from the opening 101 of the first die 102 in response to the reciprocative movement of the second die 104.

In operation, the molding 7 will be produced by the molding machine as described hereinafter.

The molding 7 will be produced in the order of the side molding part 7C, corner molding part 7B, upper molding part 7A, corner molding part 7B, and side molding part 7C. All of the molding parts 7A to 7C are extruded by the molding machine in the shape of strip.

Figure 23:
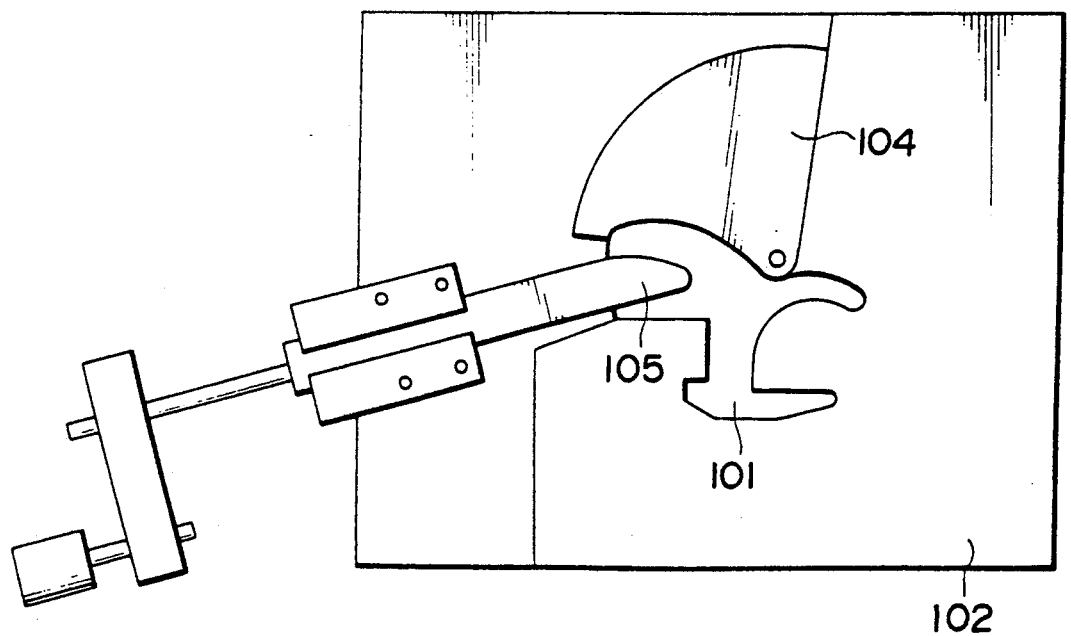

The first to third dies 102, 104, 105 are mutually positioned as shown in FIG. 23 to form a side molding part 7C. A strip of thin metallic foil is inserted into the opening 101 of the first die 102 at a position corresponding to the connecting portion 72 of the molding 7. Firstly, the plastic material is extruded through the opening 101 of the first die 102, thereby forming a leading end of the side molding part 7C. When the side molding part 7C is extruded to a predetermined extent, the second die 104 is raised to widen the opening 101 and to increase the thickness of the inward wing portion 75. Then the third die 105 advances into the opening 101 to form a water drain channel 78 on the large thickness portion of the inward wing portion 75.

The side molding part 7C is extruded to a second predetermined length. Then, the second die 104 is moved downwardly as shown in FIG. 22, thereby decreasing the area of the opening 101 corresponding to the inward wing portion 75. Thereafter, the inward wing portion 75 is gradually thinned. As the inward wing portion 75 is thinned, the third die 105 is retracted in the direction as shown in FIG. 22 in timed relation with the movement of the second die 104, thereby decreasing the depth and width of the opening of the water drain channel 78.

Figure 22:
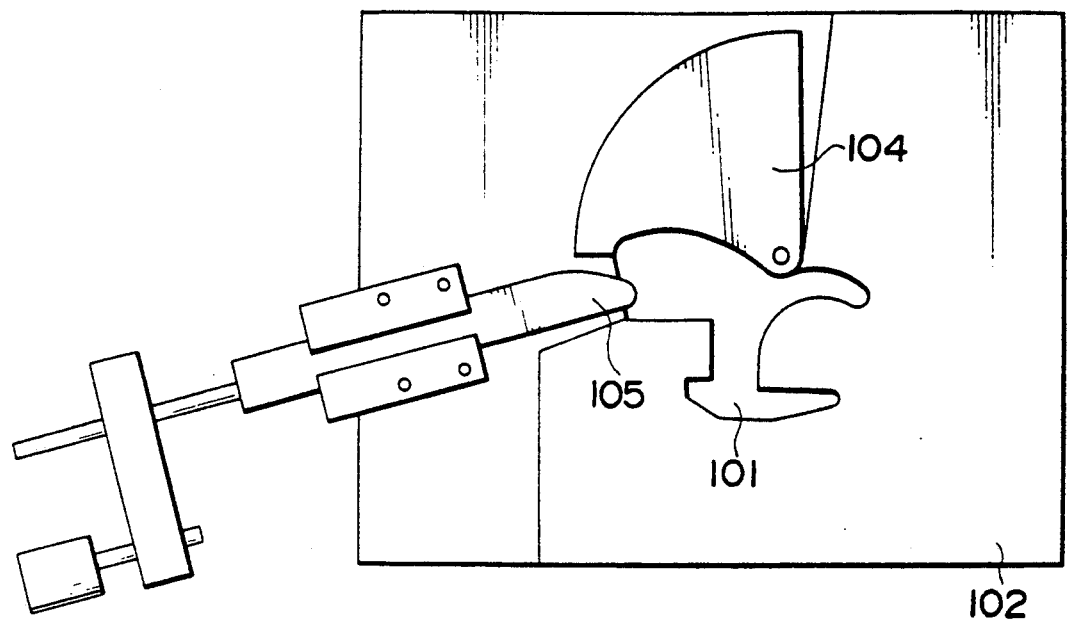

When the entire side molding part 7C becomes long as predetermined, the third die 105 begins to move away from the opening 101 of the first die 102 and to form a corner molding part 7B as shown in FIG. 22. Under this condition, the water drain channel 78 begins to disappear on the inward wing portion 75. Further, the second die 104 is moved downwardly as shown in FIG. 21, thereby extruding the upper molding part 7A to a predetermined extent.

The foregoing operations of the first and second movable dies 104, 105 are repeated to extrude the upper, corner and side molding parts 7A to 7C in the integral form.

Figure 24:
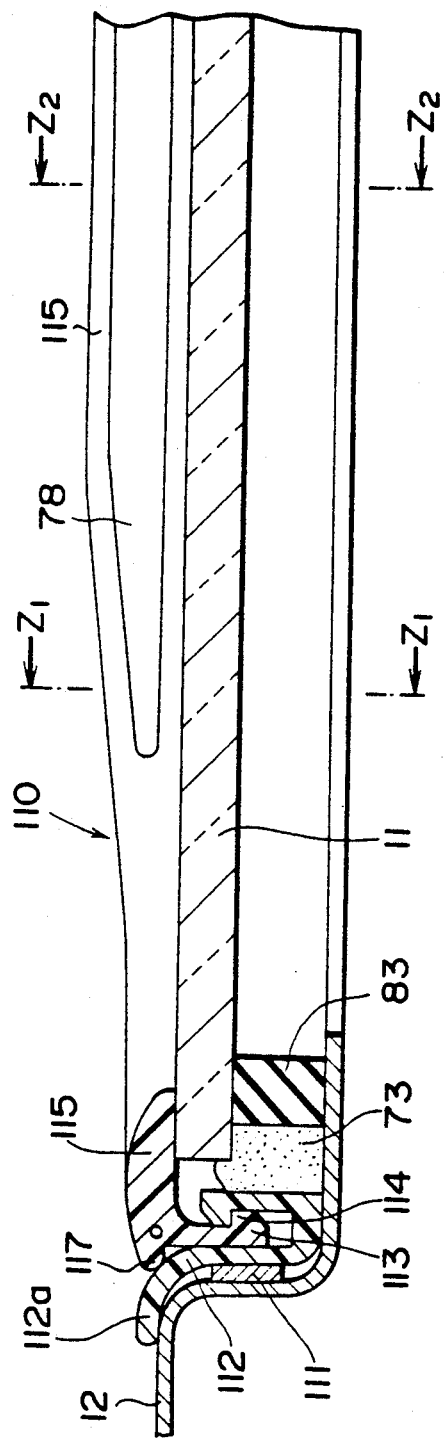
FIG. 24 is an enlarged sectional view showing a windshield molding according to a fifth embodiment.
Figure 26:
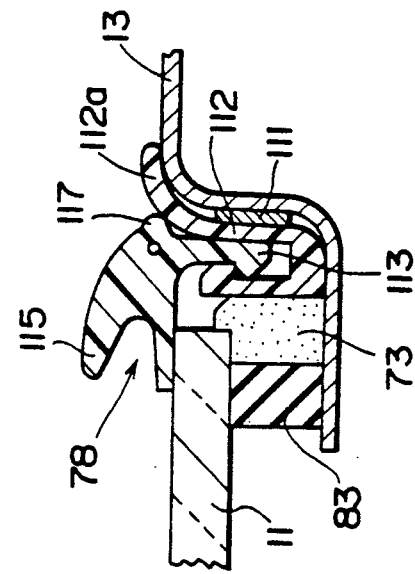
FIGS. 26 is a cross sectional view taken along line $Z_2$—$Z_2$ of FIG. 24.
Figure 25:
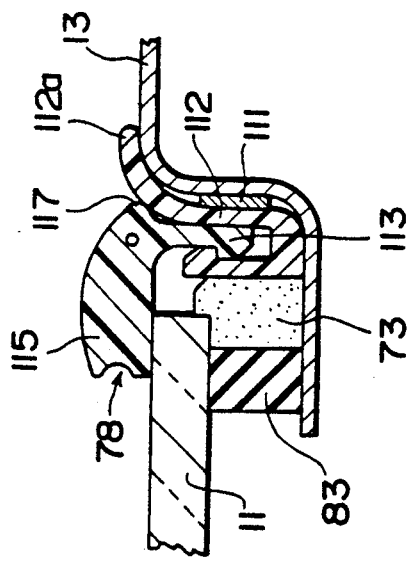
FIG. 25 is a cross sectional view taken along line $Z_1$—$Z_1$ of FIG. 24.

FIG. 24 to FIG. 26 show still another molding according to a further embodiment of the invention. Only the portions different from those of the molding 7 will be described hereinafter.

A molding 110 is attached to the roof panel 12 and pillar panels 13 by means of a fastener 112 stuck by an adhesive 111. Specifically, a dent 114 at the lower end of the connecting portion 113 engages with the fastener 113 so as to make the inward wing portion 115 contacted with the surface of the windshield 11. Then the molding 110 is attached around the edge of the windshield 11. Under this condition, the outward wing portion 117 of the molding 110 is in flexible contact with the body panels 12, 13 via the lip 112a of the fastener 112.

It is needless to say the moldings according to the invention are applicable to installation of a rear window.

What is claimed is:

1. A method for producing an automobile windshield molding strip having a water drain channel by using a molding machine having first, second, and third dies, said method comprising the steps of:
    extruding molding material through an opening formed between said first and second dies to form a molding strip having an exterior wing joined by a connecting portion with a foot;
    moving said second die relative to said first die to increase the cross-sectional area of said exterior wing; and
    gradually projecting said third die into said exterior wing while said second die is moved relative to said first die to form a water drain channel in the exterior wing.

2. The method according to claim 1, wherein said step of moving said second die member comprises the step of translating said second die member relative to said first die member to increase the cross-sectional area of said exterior wing.

3. The method according to claim 1, wherein said step of moving said second die member comprises the step of pivoting said second die member relative to said first die member.

4. A method for producing an automobile windshield molding strip using a molding machine having first, second, and third dies, comprising the steps of:
    extruding a first side portion having an exterior wing joined by a connecting portion with a foot, said exterior wing of said first side portion having a water drain channel formed therein by said third die;
    gradually removing said third die from said exterior wing to gradually decrease the depth of said water drain channel in said exterior wing;
    gradually moving said second die relative to said first die to gradually decrease a cross-sectional area of said outer wing simultaneously while removing said third die from said exterior wing;
    completely removing said third die from contact with said outer wing and extruding a first corner portion having no water drain channel therein;
    extruding an upper portion having no water drain channel therein;
    extruding a second corner portion having no water drain channel therein;
    moving said second die relative to said first die to gradually increase the cross-sectional area of said exterior wing; and
    projecting said third die into said exterior wing while said second die is being moved relative to said first die to there from a second side portion having a water drain channel formed in said exterior wing.

* * * * *